(12) United States Patent
Rebolledo-Mendez (10) Patent No.: US 10,175,756 B2
(45) Date of Patent: Jan. 8, 2019

(54) TACTILE REPRESENTATION OF DETAILED VISUAL AND OTHER SENSORY INFORMATION BY A PERCEPTION INTERFACE APPARATUS

(76) Inventor: Jovan David Rebolledo-Mendez, Louisville, KY (US)

(*) Notice: Subject to any disclaimer, the term of this patent is extended or adjusted under 35 U.S.C. 154(b) by 676 days.

(21) Appl. No.: 13/046,389

(22) Filed: Mar. 11, 2011

(65) Prior Publication Data

US 2011/0287393 A1 Nov. 24, 2011

Related U.S. Application Data

(60) Provisional application No. 61/315,968, filed on Mar. 21, 2010.

(30) Foreign Application Priority Data

Oct. 31, 2008 (JP) .................................. 2008-280876

(51) Int. Cl.
*G09B 21/00* (2006.01)
*G06F 3/01* (2006.01)

(52) U.S. Cl.
CPC .............. *G06F 3/016* (2013.01); *G06F 3/011* (2013.01); *G09B 21/00* (2013.01); *G09B 21/003* (2013.01); *G06F 2203/014* (2013.01); *G09B 21/007* (2013.01)

(58) Field of Classification Search
CPC .... G09B 21/007; G09B 21/003; G09B 21/00; G06F 3/011; G06F 3/016
USPC .................................................. 434/112–113
See application file for complete search history.

(56) References Cited

U.S. PATENT DOCUMENTS

| | | | | |
|---|---|---|---|---|
| 5,165,897 A | * | 11/1992 | Johnson | 434/113 |
| 6,712,613 B2 | * | 3/2004 | Depta | 434/114 |
| 7,551,161 B2 | * | 6/2009 | Mann et al. | 345/156 |
| 2002/0158836 A1 | * | 10/2002 | Ishmael et al. | 345/156 |
| 2005/0272012 A1 | * | 12/2005 | Logan et al. | 434/112 |
| 2008/0249718 A1 | * | 10/2008 | Suzuki | G06F 3/016 702/41 |

(Continued)

OTHER PUBLICATIONS

Bliss, James C. "A Relatively High-Resolution Reading Aid for the Blind" IEEE transaction Man-Machine System. vol. MMS-10, No. 1, Mar. 1969.*

(Continued)

*Primary Examiner* — Robert J Utama (57) ABSTRACT

The present invention describes a series of embodiments that permit the characterization of digital information (i.e. pixels from screen, data from sensors, etc.) onto analogical tactile air-fluxes perception of such data (such as hue, lightness, saturation, and chromaticity, among others), by using software, hardware and pneumatic embodiments to form an apparatus targeted originally for visually impaired people, but with applications to other types of users as well. Such characterizations are based in the change of three different variables affecting directly each single the apparatus' air fluxes: pressure, frequency and heat. This patent also includes the mode of using any Operating System's windowing elements, such as window's borders, menu, etc., into such representation executed and supplied by the apparatus. The use of a mouse, its movement and clicking are also described as part of this invention.

1 Claim, 6 Drawing Sheets

(56) References Cited

U.S. PATENT DOCUMENTS

2009/0130639 A1* 5/2009 Skinner .................. 434/114
2012/0280920 A1* 11/2012 Jackson et al. ............ 345/173

OTHER PUBLICATIONS

Bliss, James et al. "Effects of display Movement on Tactile Pattern Perception." Perception & Psychophysics, 1966.*
Amemiya, Kenichi. "Portable Tactile Feedback Interface Using Air Jet" ICAT 99.*

* cited by examiner

ABSTRACT

TACTILE REPRESENTATION OF DETAILED VISUAL AND OTHER SENSORY INFORMATION BY A PERCEPTION INTERFACE APPARATUS

This invention is related with the equipment and apparatus that have a need for tactile perception, with special attention to visually impaired people.

PRIOR ART

There are other Prior Art Patent Documents (see Prior Art Patent Document 1) that are related with the use of Braille pattern by using some fluids of mechanical elements.

In Prior Art Patent Document 1, there are some techniques that make frequent projection of fluid with pressure, with exception of example 9 shown in FIG. 14, a Braille Information system is proposed that outputs by blowing air. In the Prior Art Patent Document 1 FIG. 8, a display device made up from a matrix of Braille cells and by Braille keyboard input methods is shown.

In addition, Prior Art Patent Document 2, a device that processes information and inputs information of three dimensional data. This three dimensional information processing apparatus displays multi valued three dimensional information by displacing every individual axis with changes of pressure, making it possible to feel three dimensional objects with the sum of all the multiple single movements of every single axis.

In the Prior Art Patent Document 3, a stimulation device is proposed for a tactile sensors system that is presented in a two dimensional array by the projecting spout pressure. In this device the fluids give an intermittent injection onto the tactile skin, and the information that is perceived by the tactile sensors of stimulus.

In addition, also there are patents that indicate the operative position of the keyboard and the device that induces course for the visually impaired people by blowing air on the surfaces of handlers that support people for walking around (See Prior Art Patent Document 4, 5 and 6).

The documents related with the Prior Art are listed next:
[Patent Document 1] U.S. Pat Gazette No. 6-259006 (paragraph numbers (0043) to (0050), (0088) to (0094), FIG. 8, FIG. 9, FIG. 14)
[Patent Document 2] U.S. Pat Gazzette No. 2-276400 (lower right column of page 4)
[Patent Document 3] Hiraku Akira Special Gazette No. 60-19186
[Patent Document 4]. Laid-Open Patent HEI 9-90866.
[Patent Document 5]. patent publication 2002-372907.
[Patent Document 6]. patent publication 2002-342808.

The invention involves a device that makes visual information into tactile perceptible information.

The present invention is a perceptual apparatus that recognizes the information of the that appears on Screen 14, as images, text, windows, and other windowing elements managed by the OS' Window Manager, as values in RGB, hue, brightness, saturation, among other pixel related values, and transform them into individual burst that represent a portion of the displayed information. Such displayed information is firstly processed by normalizing, scaling, and averaging for obtaining the adequate pixel-embodiment ratio. If the displayed information is image or text, the Displayed Information Recognition Unit 42A characterizes the values of pressure, frequency and temperature in accordance to the also made processing of normalization, scaling and averaging, and with the First Data Conversion Definition Memory 43A which keeps the previous values of image and text characterization. If the there is text and is specified to be translated into Braille System, the Braille Text Converter 45A provides that specific functionality. The Selection Information Unit 45B decides which information is being treated and transmits it to the Pixel-Wixel Data Converter Unit 41A which makes the final assignation of the variables of pressure, frequency and temperature to the corresponding embodiments that represent that information. This information is transmitted to the First Control Unit 51A which commands the physical embodiment pneumatic units that eject the final corresponding bursts in order to represent the information.

Other technological characteristic is the capacity of representing the windowing environment elements on the Output Board 60. The managers 42B, 42C, 42D, 42E, 42F recognize the different aspects assigned in base of the information of the windowing environment that was presented in previous states. All this information is sent to 41B which sends it to the 51B to control the corresponding embodiments that represent those elements of the windowing environment.

Another technological characteristic is to represent a pointing device onto the Output Board 60 by recognizing the information in 42G and with previous state data of the device contained in 43C the characterization of the coordinates, events and states of 12 are transmitted to 510 which controls the corresponding embodiments that control the fluid bursts that represent the Pointing Device 12.

Another technological characteristic is the ability to represent other data from different sensors like sound, ultrasound, radioactivity, infrared, ultraviolet, atmospheric pressure, atmospheric temperature, speed, acceleration, curvature, angle, inclination, inclination, magnetism, electric current, voltage, resistance, among others, and characterize this information into a tactile perception for better understanding.

Another technological advantage is the ability to serve visually impaired people to use a computer or any other computing device whose output is a normal display, and visually normal people, helping them understand better the information.

CODE DESCRIPTIONS

11. Keyboard.
12. Pointing Device.

13. Sensor Input Modules.
14. Screen.
20. OS' Window Manager.
20A. Image of flower in window active 21A.
20B. Text "Flower" in window background 21B.
21. Window Border (aka window frame).
21A. Active window/Frame that contains elements inside the active window.
21B. Inactive window/Frame that contains elements inside the inactive window.
22. Pointing Device 12.
23A. Menu Bar of window 21A.
23B. Menu Bar of window 21B.
24. Clock.
30. First Processing.
40. Second Processing.
41A. Pixel-Wixel Data Converter Unit.
41B. Window Frame Position Data Converter.
41C. Pointer Conversion Position Manager.
42A. Displayed Information Recognition Unit.
42B. Window Frame Position Manager.
42C. Desktop Information Manager.
42D. Menu Bar Manager.
42E. Visual Event Manager.
42F. Secondary Data Manager.
42G. Pointing Device Tracker Manager.
42H. Final Instruction Recognition Unit.
43A. First Data Conversion Definition Memory.
43B. Second Data Conversion Definition, Memory.
43C. Pointer Definition Memory.
44. Window Selection Unit.
45A. Braille Text Converter.
45B. Selection Information Unit.
50. Main Control.
51A. First Control Unit.
51B. Second Control Unit.
51C. Third Control Unit.
52. Air Pump.
53. Main Control Manager.
60, Output Board.
61A. Active window made by output air bursts that are high in intensity of the variables/Frame that contains elements inside the inactive window represented by output air bursts.
61B. Inactive window made by output air burst that are lower in intensity of the variables/Frame that contains elements inside the inactive window.
62. Representation of the flower image made by the air bursts.
62A. Air bursts that have a high definition (high value of the variables).
62B. Air bursts that have a lower definition (lower value of the variables).
63A. Menu bar of the active window, represented by the Abbreviated Braille System in higher values of the fluid burst variables.
63B. Menu bar of the inactive window, represented by the Abbreviated Braille System in lower values of the fluid burst variables.
64A. "Flower" word displayed text in dotted definition, represented by corresponding air bursts.
64B. "flower" displayed text in Braille System, represented by the corresponding air bursts.
64B1. Value of "f" in Braille System.
64B2. Value of "l" in Braille System.
64B3. Value of "o" in Braille System.
64B4. Value of "w" in Braille System.
64B5. Value of "e" in Braille System.
64B6. Value of "r" in Braille System.
65. Representation of the pointer by the fluid bursts.
66. Representation of the clock by the fluid bursts.

Problems to be Solved by the Invention

In the Prior Art Patent Document 1 and 3 the technique of making tactile recognition of information, such as characters, is addressed by changing the axis displacement of air and liquid spouts, and by feeling vibration in pattern stimulation.

In addition, in Prior Art Patent Document 9 in FIG. 1 a block diagram is shown that describes a separate Braille Display and the Braille Display Controller is described in FIG. 8, where the Braille system is done by a multi-line multi-cell column, where it is not used just for normal displaying purposes, but also can be configured as a Braille Display.

Recently, the use of personal computers in processing information in the form of characters and images has spread exponentially, but in order to make any computer more functional and intuitive for visually impaired people it is still necessary to overcome many obstacles.

That is when the invention presented in this document explains the apparatus to provide information perception that is usually represented visually on normal displays (such as images, video, image, digitalized audio, UV, radiation, touching and any other form of information that can be perceptible by their visual representation with normal eyes), but to be perceived tactilely by the skin and/or tactile sensory system.

Methodology to Solve the Problem

In certain embodiments of this invention an innovative perception apparatus is described which consists of controlling the burst fluids in the said bursting air embodiment by the said Displayed Information Recognition Unit 42A which identifies the information that is displayed on the said Screen, and previous data and localization is coordinated by the said First Data Conversion Definition Memory 43A, which is originated in the said OS' Window Manager 20 and assigns and encodes and configures the corresponding pixel information properties of RGB, hue, saturation, brightness, and other displaying picture data, into the pre-established, and reprogrammable, said embodiment variables of fluid pressure, fluid frequency and fluid temperature accordingly decoded and interpreted into the corresponding localized representation of bursting air embodiment made by the said Pixel-Wixel Data Converter Unit in order to be perceived tactilely on the skin, the said Pixel-Wixel Data Converter Unit 41A transfers such information to the First Main Control which commands the burst behavior of the said corresponding bursting air embodiment contained in the said Output Board 60 to be tactilely perceived.

The invention in certain embodiments, related with the sensory apparatus described above, concerns the information that corresponds with the coordinates, focus, colors, textures and other details of the window frames managed by the said OS' Window Manager 20 and displayed in the said Screen 14 is received by the Window Frame Position Manager 42B, in addition to the said Desktop Information Manager 42C keeps and manages the information and coordinates of every element on the desktop that the said OS' Window Manager 20 is executing, in addition the said Menu Bar Manager 42D receives the information that concerns the menu and translates to said Braille system, if required by the user, all the text data contained in the menu, in addition the said Visual Event Manager 42E receives and translates the information of events happening on the said desktop, in addition the Secondary Data Manager 42F translates all other information that is not presently visible but executing on the said desktop, and such information is translated into the Window Frame Position Data Converter 41B, which in turn gathers and encodes it into the said embodiment variables of the corresponding localization, coordinates, events, and states, of the previously stored information of the said Window Frame Position Manager 42B, the said Desktop Information Manager 42C, the said Menu Bar Manger 42D, the said Visual Event Manager 42E, the Secondary Data Manager 42F, and by the Second Data Conversion Definition Memory 43B, in which previous states of the said windowing system has been processed, such information and windowing details are processed by the said Window Frame Position Data Converter 41B and sent to the said Second Control Unit 51B to manage the different corresponding said apparatus of the said variables' values in the said Output Board 60 representing the corresponding said windowing properties of the presented said desktop environment so the said decoded windowing characteristics are tactilely perceived on the Output Board 60.

In certain embodiments described in this invention the section in the perception apparatus that controls the means that positions and instruction the device such as pointer or mouse that usually can be operated on the said desktop controlled by the said OS' Window Manager 20, and displayed on the said Screen 14, where the Pointing Device Tracker Manager 42G updates the current coordinates of such pointer and communicates with the said Pointer Conversion Position Manager 41C, which receives information from the said Pointer Definition Memory 43C of previous and historic states, and assigns the corresponding predetermined values of the said variables of the said embodiment that characterize and represent the said pointer device on the said Output Board 60, by transferring that data to the Third Control Unit 51C which directly controls the said values of the said variables of the said set of the said embodiment points.

In certain embodiments described in this invention the capability of the said windowing environment and all the interaction that happens among all its elements, like the said Frame Positioning, the said Menu Bar information, the said Desktop information, the said Visual Event information 42E, the other said windowing environment elements, and the said pointer localization and events that it produces to be recognized by the said Final Instruction Recognition Unit 42H, and encodes the synchronization of that interaction in order to said Window Selection Unit 44, which also sends information to the Pixel-Wixel Data Converter Unit 41A to control the positioning and representation of the characters, in either Braille system or any other configurable text decoding, for such information to be finally represented in the Output Board 60 by the set of embodiments that characterize such information in a tactile representation.

In certain embodiments described in this invention, and in continuation and related to the paragraph above, the distinguished functionality of the Window Selection Unit 44 information processing of representing the said windowing event behavior of the said elements of the said OS' Window Manager 20 to control correctly the different set of the said embodiments that are needed for the depiction of that information in the corresponding value interpreted from the said variables of pressure, frequency and temperature of flowing fluid, in the said Output Board 60.

In certain embodiments described in this invention the capacity of the embodiments to represent any combination of pixel or visual units, like altitude of terrains on data maps, three dimensional Imaging, video, meteorological information, rainfall and temperature on terrain of the said maps, digital representation of smells, acoustic sensor, infrared sensor, UV sensor, radiation sensor, and touching sensor perceived by components that are attachable to this device, and to First Processing 30, and/or in conjunction with the computer and other electrical components that are inputting into the said First Controller 51A, and that are represented on the said Output Board 60 by characterizing the values of the said discharging of air with the said variables of pressure, frequency and temperature of the air expulsions of every single said embodiment.

Effects of the Invention

According to the present invention, the recognized information that is displayed on the said Screen 14 and originally managed by the said OS' Window Manager 20, is output in a systematic order of every single said embodiment that represents a or a set of said pixel data in every fluid burst, which becomes tactile perceptual information by execution of the expulsion, and synchronized burst, of fluids (conventionally related, but not limited, to air and gases).

In addition, when there is information presented in different quantities of the said windows of the said OS' Window Manager 20, as appearing and displaying on a said Screen 14, the apparatus has a capacity of recognizing, understanding, managing and representing every individual window which its individual contents of information, keeping that different individual information of different windows. In the same manner, the said events and elements of the said OS' Window Manager 20 differential information of those elements is accordingly represented.

Furthermore, the invention presents the ability of representing the said pointer, by a special setting of the said variables (fluid pressure, frequency, and temperature), making it differentially noticeable among the other embodiment, so a person can tactilely recognize the coordinates, movements, and events the said pointer over the said windowing system, enabling visually impaired people to manipulate and use a personal computer, PDA, tablet, mobile phone, and any other device in which its original output to the user is visual, being usable as well by visually normal people.

In addition, the invention permits the tactile recognition of every individual element of the said OS' Window Manager 20, as said windows, said menus, said buttons, and other elements managed by the said OS' Window Manager 20, making it possible to understand and operate effectively those elements.

Invention Originality

The first original implementation of this invention as a perception apparatus is an equipment that recognizes the information of every single pixel, or displaying method, that is displayed on the monitor display, or said Screen 14, the said Displayed Information Recognition Unit 42A recognizes the information of the value of RGB, hue, saturation, brightness, tone, and assigns specific configuration of the said variables of pressure, frequency and temperature by the First Data Conversion Definition Memory 43A, and such configuration and pre-values are managed and stored by the said First Data Conversion Definition Memory 43A, which keeps also information of the previous state of the apparatus and the said variables pressure, frequency and temperature, and such information is passed to the said Pixel-Wixel Data Converter Unit 41A, which recalibrates and standardizes the present state with the previous state in order to present a smooth transition of the said variables, and the final calibrated information is passed to the First Control Unit 51A which instructs and controls the mechanical output of the different variables that the ventilation of every single pneumatic embodiment should have as an element of the output value on the said Output Board 60, representing the original information of said Screen's 14 pixels into the said Output Board's 60 embodiment. According to this apparatus it is possible to recognize the displayed information, as on the visual display said Screen 14, because of the output burst and ventilation characterization of the involved recognized and processed pixel data, so the perception of information is possible by the use of the fluid which bursts from the different synchronized by the set of said embodiment.

The second original implementation of this invention as a perception apparatus, included in the previous described apparatus, corresponds to the means of control that displays multiple windows, of the OS' windowing environment, as visual elements on the said Screen 14, as well as the menu, bars, buttons and other elements found in the said windowing system, including pointer whose processing is treated specifically later, so the elements of the said windowing environment can be recognized by the said Window Frame Position Manager 42B, the said desktop elements are recognized by the said Desktop Information Manager 42C of the current OS of the First Processing 30, the said menu elements are recognized by the said Menu Bar Manager 42D, the said events generated by the interaction of the different elements of the said window manager can be recognized by the said Visual Event Manager 42E, and the said other windowing visual elements as shadows or buttons, among others, can be recognized by the said Secondary Data Manager 42F, each one of the said Managers converts the windowing image information into the corresponding values of the said variables of pressure, frequency and temperature for the expulsions of air and this information is transmitted to said Window Frame Position Data Converter 41B, which also receives information from the said Second Data Conversion Definition Memory 43B which helps as a historic log data container of previous states of the represented apparatus, so the processed information from the Window Frame Position Data Converter 41B is transmitted to the Second Control Unit 51B which commands and controls the mechanics of the said apparatus involved in the representation of that information over the said Output Board 60. According to this apparatus, the display of multiple windows, each one containing different information such as menu, buttons, and other elements, as well as the events of the said windowing manager, such as focusing or latent information, as it appears on the said visual Screen 14, could be represented accurately with the said apparatus in a tactile way.

The third original implementation of this invention as a perception apparatus, included in the first described apparatus, corresponds to the apparatus of Pointing Device Tracker Manager 42G that recognizes the representation of the said Pointing Device 12 that is displayed and interacts with the different windows and their elements in the said windowing manager, by identifying the location, direction, and events that such said Pointing Device 12 has, and instructs in base of the information of previous states by the Pointer Definition Memory 43C, to convert the fluid burst of each of the said embodiment of the output fluid of the said Output Board 60, in base of the configured values assigned of the distinctive said variables of the said embodiment, and such information is processed by the Third Control Unit 51C which commands and controls the mechanization of the corresponding ejection and burst of fluid for the representation of the said Pointing Device 12 on the said embodiment contained in the said Output Board 60, so such said Pointing Device 12 could be perceived distinctively from the other elements represented, with an individual configuration of representation of those said variables, permitting the use and command of such said Personal Computer, PDA, Tablet, Mobile, and any other device that originally has a visual screen 14 for representation of information, permitting a visually impaired person to tactilely receive information to control such said Computer as well as for visually normal users to immerse themselves into deeper understanding of such information.

The fourth original implementation of this invention as a perception apparatus, included in the second described apparatus, corresponds to the recognition of the position, coordinates and state of the said Pointing Device 12 by the Pointing Device Tracker Manager 42G, and the said Pointing Device Tracker Manager 42G determines the current and constant position, coordinates, events and state on the different said elements of the said OS' Window Manager 20, and the value of the said variables of the said embodiment of the said elements of the frame windowing environment controlled by the Window Selection Unit, making the representation of such said frame windowing environment onto the fluid burst of the individual corresponding said embodiment that represent tactilely the said Pointing Device 12 and the said frame windowing environment individually on the said Output Board 60, making it possible for both, visually impaired and normal users, to operate and control the said visual Screen 14.

The fifth original implementation of this invention as a perception apparatus, included in the described fourth apparatus, corresponds to the distinction of the different elements of the information made by the individual value that each of the said embodiment have in order to represent such information, and the process, control, and command of the mechanical and electrical elements involved that provide the burst from the said apparatus, and their distinct value in order to represent a segment of each said element of the said windowing environment, even with combination of those elements, providing a unique distinguishable way to tactilely characterize all and each of those. According to this apparatus, the displayed windows of the target operation can be distinguished from the other display of windows, and the ability of handling the display of information as tactile information while being understood, displayed and manipulated.

The sixth original implementation of this invention as a perception apparatus, included in the described first apparatus, corresponds to the particularity of representing various types of information related with maps or digital representation of maps such as altitude, meteorological information, rainfall value, topographical data, as well as digitalization representation of smells, acoustic sensor, infrared sensor, radioactive sensor, and touching sensor, representing that information on the said Output Board, which characterization on the said embodiment is made by the First Control Unit 51A. This execution is made by recognizing the resolution of the display output, and normalizing this with the size of the said Output Board's embodiment, and according to the division of the data of the pixels that are processed by the said OS' window manager, like brightness, RGB value, hue, representing this information for every set of normalized pixels into the values of the said variables of pressure, frequency and temperature that are controlled in the fluid burst and expulsion of the said embodiment of the said Output Board.

The follow description belongs to the drawings that explain this invention.

Figure 1:
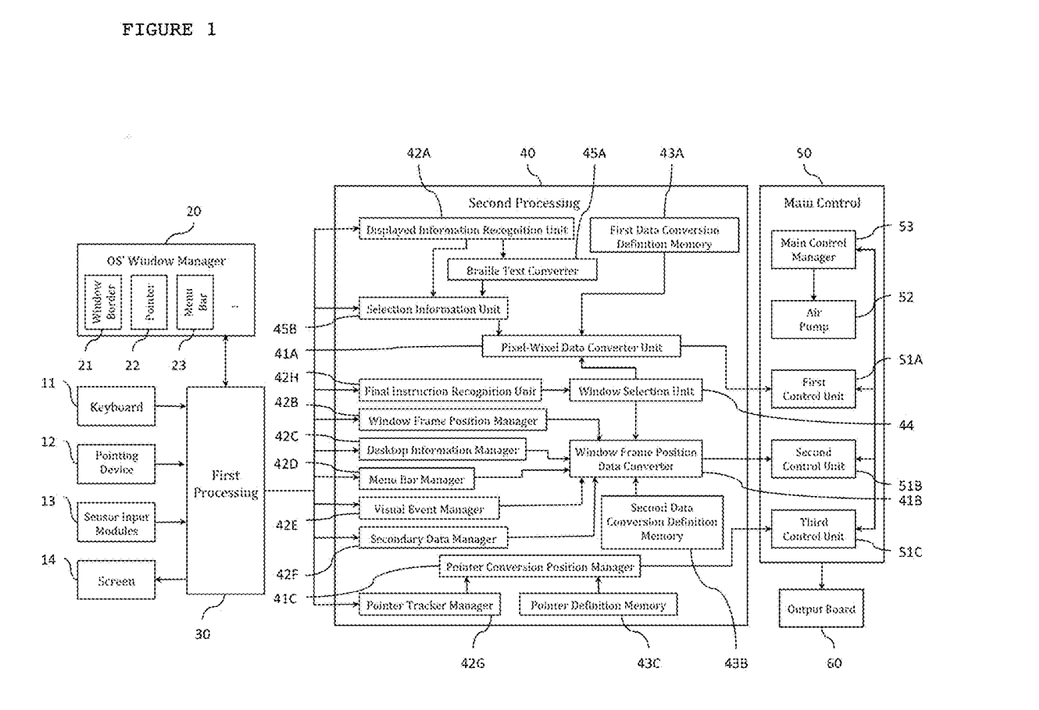
FIG. 1 Block diagram of the design of the invention perception device features.
Figure 2:
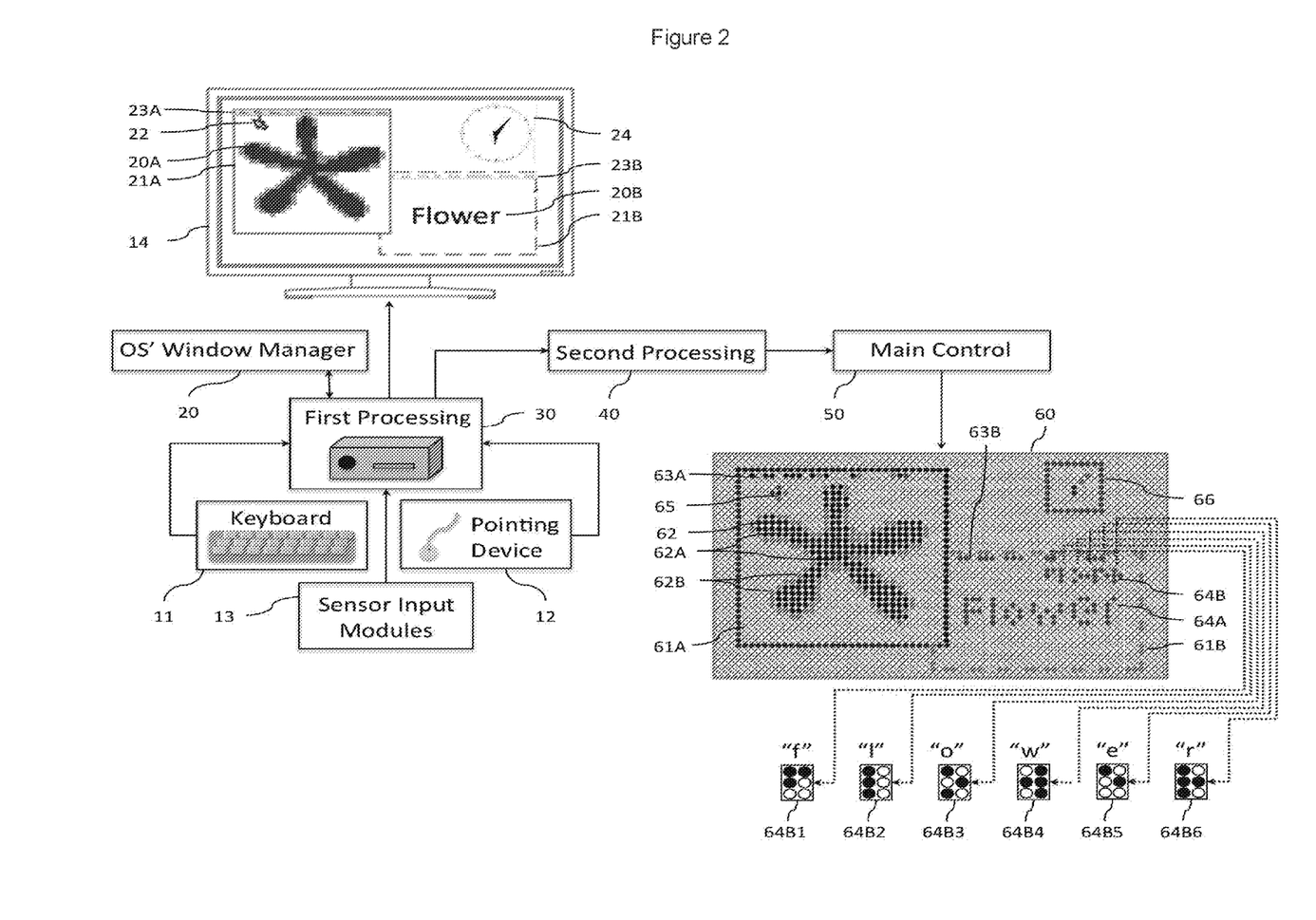
FIG. 2 Illustration showing the relationship between the displayed information on the screen and the Output Board representation of that information.
Figure 3:
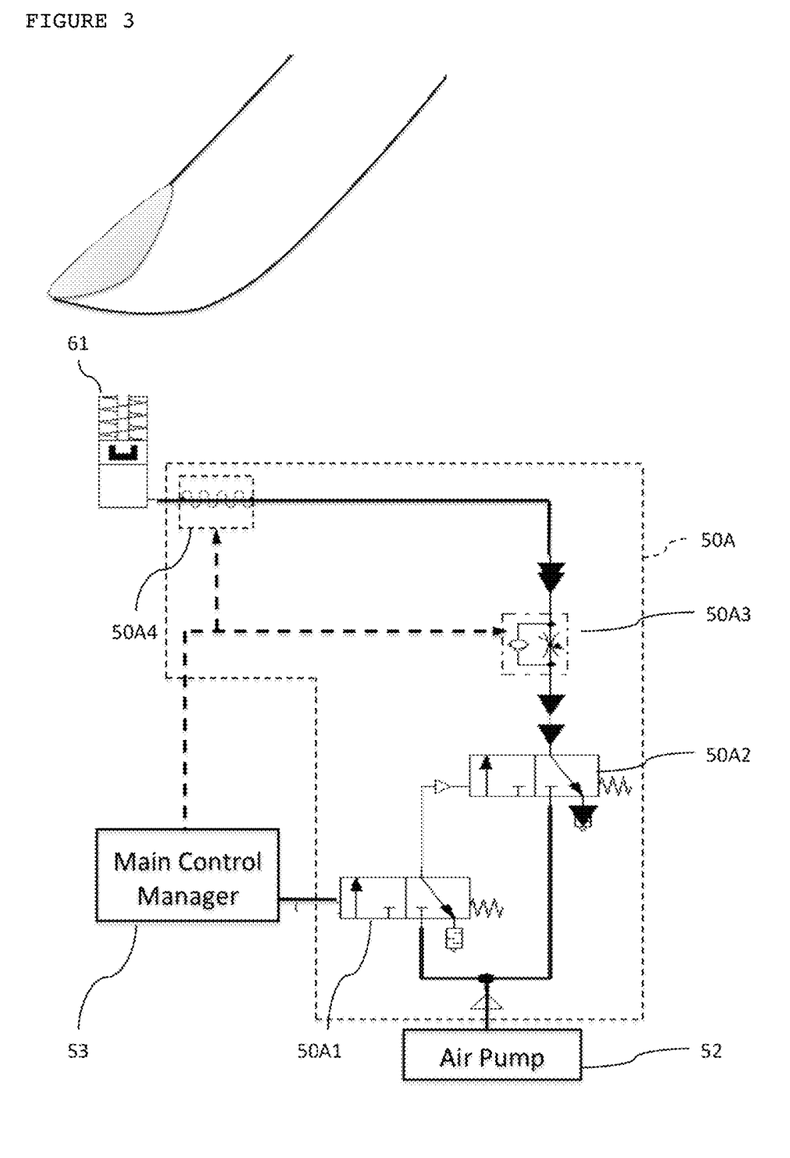
FIG. 3 Representation of a embodiment pneumatic system. An Output Board 60 consists in a matrix of n by m embodiments. The state of this embodiment is "off", blank, or absence of information from the aperture 61.
Figure 4:
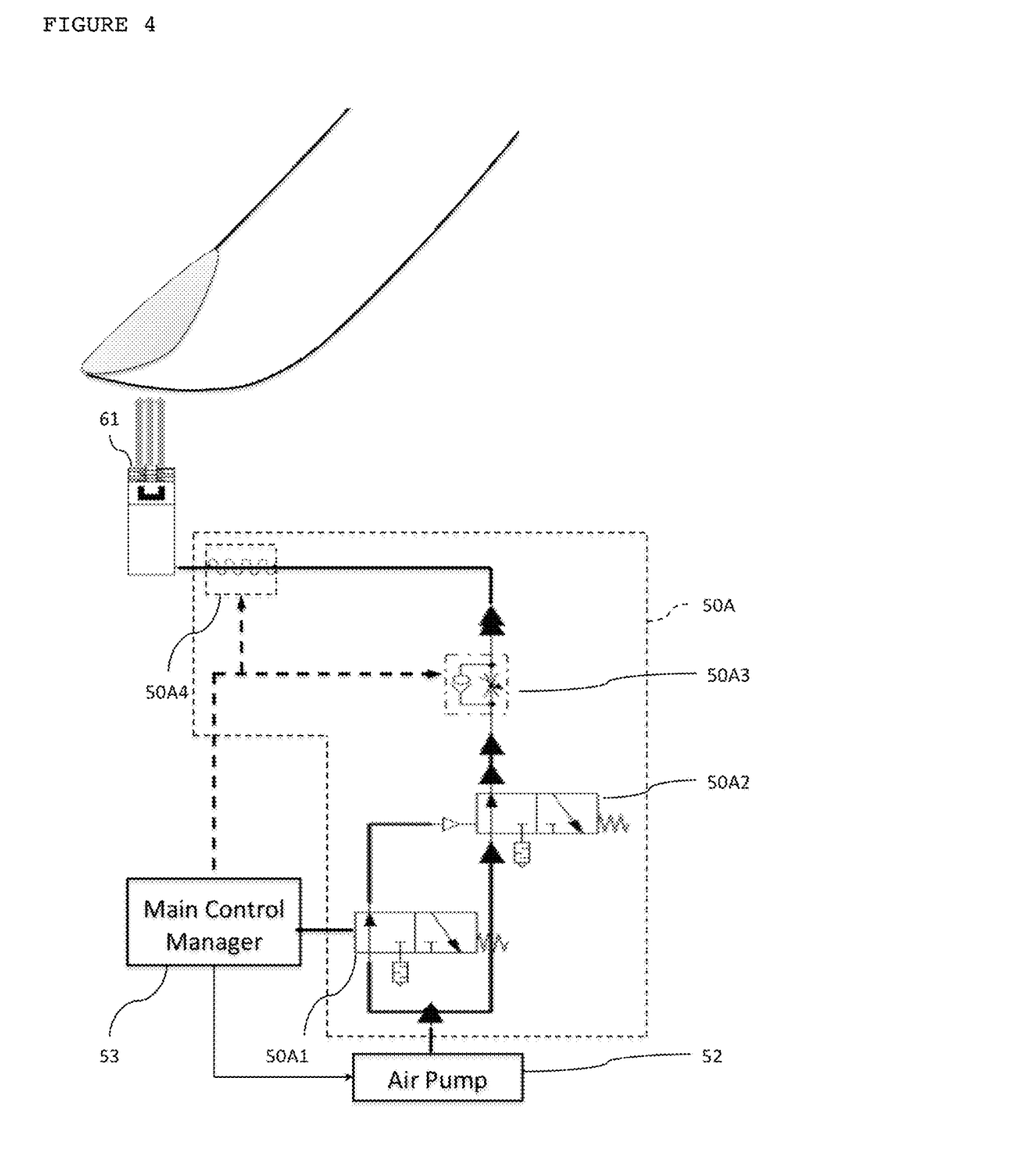
FIG. 4 Representation of a embodiment pneumatic system. An Output Board 60 consists in a matrix of n by m embodiments. The state of this embodiment is "on", bursting air from the aperture 61 with values of pressure, frequency and temperature assigned to it.
Figure 5:
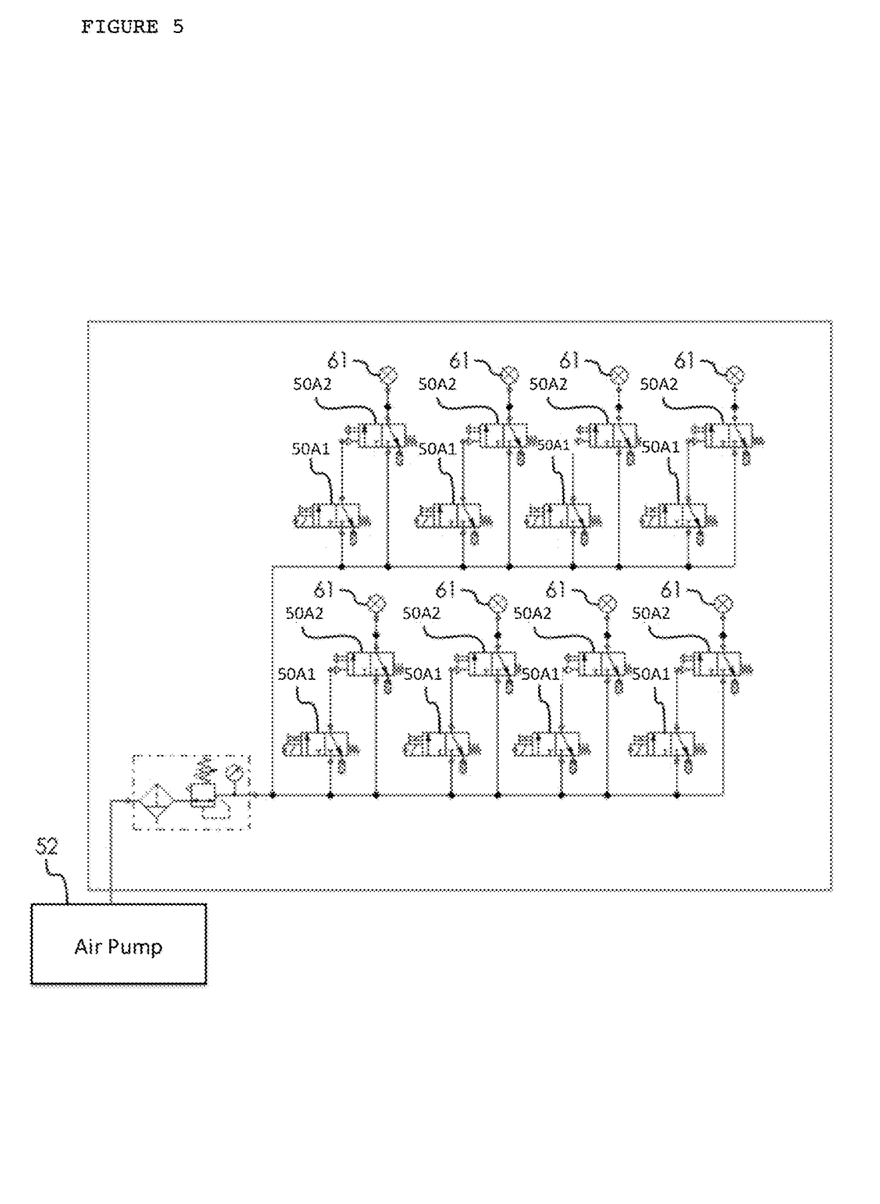
FIG. 5 Diagram that shows the representation of a 4×2 matrix of embodiments, visualizing the flowing of fluids.
Figure 6:
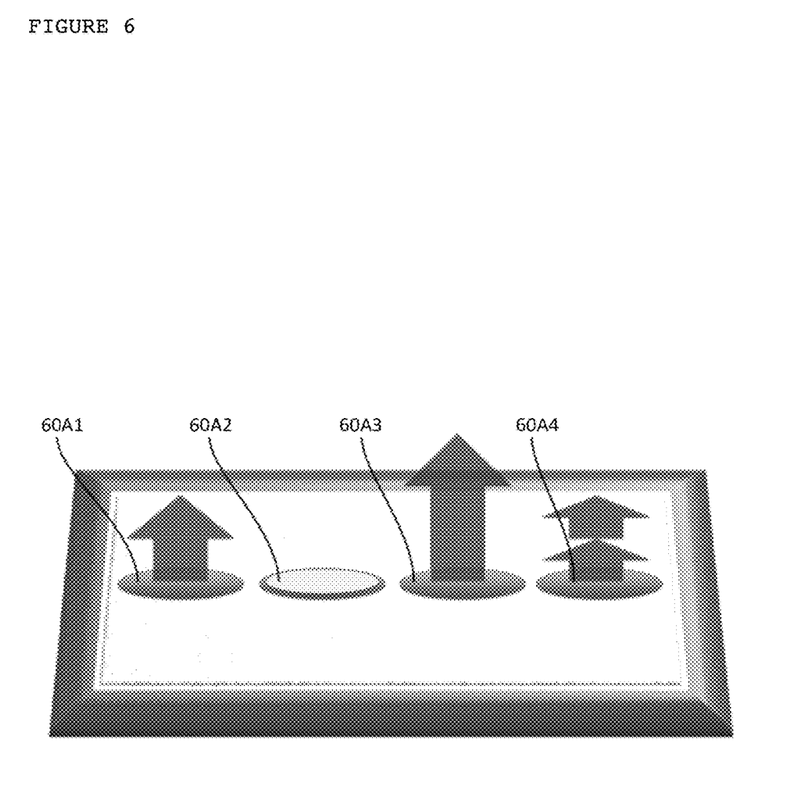
FIG. 6 Illustration showing the different states of fluid bursting from the embodiments.

On FIG. 1 it is represented the block diagram of the perception apparatus of this invention; on FIG. 2 the relationship of the visual monitor and the said Output Board is indicated; FIG. 3 shows the Stop State of the stream of fluid, said air, from the said embodiment; FIG. 4 represents the configuration diagram of the Flowing State of the stream of fluid from the said embodiment; FIG. 5 is the structure diagram of the set of multiple said embodiment of the perception apparatus; FIG. 6 illustrates the different states for tactile perception of the said embodiment.

Firstly, the present invention of the apparatus and its configuration diagrams are graphically described in FIG. 1 and FIG. 2.

As shown in FIGS. 1 and 2, the sensory apparatus relates with the OS' window manager 20 which receives commands and input information from the Keyboard 11, and Pointing device 12 inputs that controls a computer or other device that outputs visual information like Personal Computer, PDA, tablet, mobile, cell phone, etc., by inputting information from the Keyboard 11, a Pointing device 12, Sensor Input Modules 13, and outputs the displayed processed information visually on a Screen 14. The First Controller 30 module receives the information of the Window Border 21, Pointing Device 12, Menu Bar 23, and the other modules controlled by the OS' Window Manager 20, and the First Controller 30 recognizes the different modules that control the different elements of visualization of the windowing environment of the operating system that controls the computer, and that information is transferred from the OS' Window Manager 20 to the First Controller 30. The information received in the First Controller 30 is structured by the modules of the OS' Window Manager 20 and the changes of input received from the Keyboard 11, Pointing Device 12, and other Sensor Input Modules 13 that can input sensored information, and that information and elements of the windowing environment, is displayed on the Screen 14, among the different elements of the OS' Window Manager 20 including the Pointing Device 12, like mouse or touch screen input, its coordinates and events, which appear on the Screen 14.

On the complete display of the Screen 14, the different elements of the windowing environment, like multiple windows, their menus, bars, buttons that are presented on those, as well as the various events that happen, affect or interact among those windows and elements, can be indicated. In FIG. 1, the OS' Window Manager 20 controls the Window Border 21, Pointing Device 12, and Menu Bar 23, among other of its elements, and are output to the Screen 14, and the presented windows can be one or many, as well as those elements can be in numbers of one or many, depending of the current state of the desktop environment.

The afore mentioned corresponds to the use of a general purpose computer, but also applied to laptop computers, tablets, mobiles, cell phones and any other computer oriented means where the user visualizes the information in form of windows managed by an operating system.

The perception apparatus of this invention controls the variations of the variables of pressure, frequency and temperature of the expulsion of air from the embodiment, or holes that contain mechanical devices to burst air outside, the Second Controller 40 decodes and interprets the information received from the First Controller 30, and that are presented on the Screen 14, made by the OS' Window Manager, and the Second Controller 40 characterizes and represents such information in a pre-established, but potentially scalable, matrix of embodiments contained in the Output Board 60, which makes the output of flowing air as fluid and dynamic to show the details contained in a windowing environment.

The Second Controller 40 is an apparatus for processing information capabilities, and information storage capabilities, where the pixel information that appears on the Screen 14, is normalized, scaled, standardized, averaged, processed and transformed to units of air expulsion embodiment, images and graphics are recognized and composed by the Pixel-Wixel Data Converter Unit 41A, the windowing differentiation and the data contained in each of the windows, like menu, bars, buttons, and window events are processed by the Window Frame Position Data Converter 41B, the means of Pointing Device 12 that permits the interaction, selection of specific data, navigation, and the state of it, this is made by the Pointer Conversion Position Manager 41C, which recognizes and instructs the position, coordinate and state of the Pointing Device 12, making the different types of information to be reconfigured in order to express distinctive tactile information on the Output Board 60.

Furthermore, the Second Controller 40 configures the information that is displayed on the Screen 14, and does information processing of normalization, standardization, and average of the different elements of Imaging processed by the Displayed Information Recognition Unit 42A, the processed frame and windows limits and coordinates by the Window Frame Position Manager 42B, the information of the elements contained on the desktop of the windowing environment by the Desktop Information Manager 42C, the text and state information of the menu bar of the different windows appearing on the windowing environment controlled by the Menu Bar Manager 42D, the information that of the effects affecting the interaction among the different elements contained on the desktop, or windowing environment, as well as their states is recognized and reconfigured, and other background information that affects the different states of the different elements of the windowing environment is registered and reconfigured by the Secondary Data Manager 42F, and the information related to the Pointing Device 12 coordinates, events and states are registered and reconfigured by the Pointing Device Tracker Manager 42G.

In addition to the previous description, in the Second Controller 40 the First Data Conversion Definition Memory 43A keeps track and records of previous states of the image and displaying information produced on the Screen 14 by the OS' Window Manager 20 and the interaction of the user and the different inputs and dynamic information that is processed and that information is transmitted to the Pixel-Wixel Data Converter Unit 41A, configuring the ejecting air of the different embodiments involved in the Output Board 60, the Second Data Conversion Definition Memory 43B keeps track and record of previous states of the elements of the windowing environment like window frames, desktop information, menu bar information, events of the visual elements, and other secondary data that is produced or generated by the interaction among those elements and is transmitted to the Window Frame Position Data Converter 41B, the Pointer Definition Memory 43C keeps track and records of previous coordinates, status and events related with the Pointing Device 12 and the information corresponding to the values of the variables of the different embodiments involved assigned to the coordinates, status and events of the Pointer Device 12 is transmitted to the Pointer Conversion Position Manager 41C, and all this information is transmitted to the Third Control Unit 51C which executes and commands the physical mechanical operation of every single embodiment on the matrix of embodiments contained in the Output Board 60 which throws air reformatted into the variables of pressure, frequency and temperature.

The First Data Conversion Definition Memory 43A stores the information of the output venting/burst of all the individual embodiments in base of the predetermined, but reconfigurable, values of the three variables of air pressure, frequency and temperature, characterizing and representing the displayed information on a Screen 14, as the values of RGB, hue, saturation, brightness, and other properties of displaying information. This can be the representation of terrain information, temperature values in metrological data, rainfall values, still images, video, digitalization of smells, acoustic sensor, UV sensor, infrared sensor, radioactive sensor, touching sensors, and representation of atmospheric pressure, current relative acceleration, and surrounding obstacle mapping, represented by display properties of pixel information, by processing them by normalizing, scaling, and averaging the values of RGB, hue, saturation, and brightness data, or directly data that preformatted from the input sensors, permitting the visual impaired person to perceived all this information, as well as visual normal person to perceive the information tactile.

The Second Controller 40 uses the Window Selection Unit 44 to recognize the final information to be presented by the Final Instruction Recognition Unit 42H in order to prioritize the flow of information and the status of the main displayed windowing environment information.

The Main Control 50 receives the configuration and setting of the values of the information transmitted by the Second Controller 40, the imaging and visually displayed information processed and characterized to control and command the mechanical use of the embodiments is made by the First Main Control 51A, based on the variables of air pressure, frequency and temperature, to be presented in the set of embodiments presented in the Output Board 60, is transmitted from the Pixel-Wixel Data Converter Unit 41A, the windowing environment information processed and assigned into those variables is made by the Window Frame Position Data Converter 41B and transmitted to the Second Control Unit 51B for the further mechanical command and control of that information, and the Pointer Conversion Position Manager 41C processes the information corresponding of the coordinates and states of the Pointing Device 12 transmitting this information to the Third Control Unit 51C. The function of the Main Control Manager 53 is to resolve conflicts that could happen with the usage of the embodiments and their assigned air expulsion variables, bringing the algorithm of normalization of embodiments in order to prevent errors or misreading, it also evaluates the physical state of the physical embodiments, as well as the humidity state of each valve, and the value of the continue pressure input from the air pump, and finally, it is responsible for initializing the first state, by doing checking of the state of the physical embodiments, and the finalization of the last state, as automatic cleaning and alert of problems to the user, if they happen.

The recognition of the image, imaging and text information that appears on the Screen 14 and originally processed by the OS' Window Manager 20 happens and is processed by the Displayed Information Recognition Unit 42A which also normalizes, standardizes, scales, and averages that image information and encodes the text information into Braille reading system, in accordance to the pixel-embodiment ratio, and that information is transmitted to the Pixel-Wixel Data Converter Unit 41A which also receives information from previous states of the image information from the First Data Conversion Definition Memory 43A, and encodes the settings and configuration necessary for representing that information onto the expulsion of the air variables of pressure, frequency and temperature that are output of the set of embodiments that are found in the Output Board 60, producing a tactile recognition of that information.

The encoding of the Braille reading system, based on the recognition of the text information found by the Displayed Information Recognition Unit 42A is done by the Braille Text Converter 45A which determines the necessary configuration for the correct representation of normal text into embodiment-based Braille system, which is not limited to English and applied to any standard reading system of Braille of any other language that the operating system and the OS' Window Manager 20 are controlling and correctly displaying on the Screen 14. The Selection Information Unit 45B receives the configuration of the processed information from the Displayed Information Recognition Unit 42A, and the Braille Text Converter 45A, and makes the assortment of the different types of information, among image, video, text, and others. The selected contents made in the Selection Information Unit 45B converts the type of information, Braille text or images, video, or any other inputting means that permit its digitalization, into the embodiment format of burst air expelled from the embodiment contained in the Output Board 60.

In this way, the displayed image information recognized by the Displayed Information Recognition Unit 42A is transmitted to the Selection Information Unit 45B, which also receives the information from the Braille reading encoding of the presented text, all this data being transmitted to the Pixel-Wixel Data Converter Unit 41A. The visual information related with the framing of windows is recognized and processed by the Window Frame Position Manager 42B, the information related with the elements presented on the desktop is recognized and processed by the Desktop Information Manager 42C, the information related with the menu is recognized and processed for a Braille reading system by the Menu Bar Manager 42D, the events happening on the desktop are also recognized and processed by the Visual Event Manager 42E, the other information as focusing and other events are recognized and processed by the Secondary Data Manager 42F, all previous units and managers transfer the processed information to the Window Frame Position Data Converter 41B which received also previous states of the windowing environment values stored by the Second Data Conversion Definition Memory 43B, and also processes the multiple information sources and reconfigures the final setting of the information air ejecting values of pressure, frequency and temperature of all the set of embodiments that are contained in the Output Board 60, and such information is transmitted to the Second Main Control 51B, which command and controls all the set of the mechanical embodiments which burst the air jet characterization of such information.

The information of the Pointing Device 12 that is displayed on the Screen 14 is managed by the OS' Window Manager 20, and recognized by the Pointing Device Tracker Manager 42G, which is also functions for the normalization, scaling and average of the pixel-embodiment ratio, while the Pointer Definition Memory 43C stores previous coordinates, events and states of the Pointing Device 12, and the combined information is reconfigured by the Pointer Conversion Position Manager 41C which sends the current information location, coordinates, event and state of the Pointing Device 12 to the Third Control Unit 51C which makes the corresponding control and command of the mechanical embodiments that are involved in the representation of the Pointing Device 12 expressed by the differentiable values of the variables of pressure, frequency and temperature of the expulsion of air from the embodiment.

The Final Instruction Recognition Unit 42H recognizes the general state, and number of elements interacting in the windowing environment, determined by the OS' Window Manager 20, transmitting this information to the Window Selection Unit 44, in order to configure the information related with the values of the variables of pressure, frequency and temperature of the burst of fluid from all the embodiments involved on the current state. The Window Selection Unit 44 determines the output value of those variables for the position of the different elements found in the windowing environment, making the characterization for each single element of image, text, or other windowing element like windows, menu, and others. Furthermore, other main objective of the Window Selection Unit 44 is to normalize, scale, standardize, and average that information characterization to keep the pixel-embodiment ratio presented in the set of embodiment contained in the Output Board 60.

The differentiation made by the Window Selection Unit 44 and the information from the previous states of the different elements of the windowing environment administrated by the OS' Window Manager 20, including the Window Border 21, the Pointing Device 12, Menu Bar 23, and others, are stored in either the First Conversion Definition Memory 43A, which focuses in storing the information concerned to the images and text and transmits its, or the Second Conversion Definition Memory 43B, which focuses in storing the previous information related with the Pointing Device 12, the Output Board 60 can represent detail and differentially the various elements as presented and appeared on the Screen 14 but in a tactile characterization.

The relationship between the Screen 14 and the Output Board 60 is explained on FIG. 2.

On the monitor it is recognizable the element of an image information 20A, which represents the image of a flower, contained in an object window information 21A, which contains a delimited frame that distinguishes from the other windows and windowing elements, and encapsulates some other objects inside it that move if the window is move in the same relative location, and is controlled by OS' Window Manager 20 that transmits to the First Processing 30. Other element managed by the OS' Window Manager 20 is the characters series, as shown in the text 20B, but in this case this text element is contained in a different encapsulated object element window 21B, which border does not have the same degree of brightness in order to indicate the differentiation among other windows, and any area of this type of window can be under the current focus and activated window. The visual representation on Screen 14 of a Pointing Device 12 is shown in the arrow FIG. 22, that happen to be on window 21A but it is an object element that has the highest priority of representation meaning that it can be shown over any other element object on the Screen 14, always has absolute coordinates over the Screen 14 on the desktop. The menu bar 23A of window 21A is shown with stronger colors, while the menu bar 23B of window 21B has a lower hue in order to represent the current active window, and also the covering of that 23B menu happens whenever the area of the active window happens to be over it. The representation of other elements controlled by the OS' Window Manager 20, like the clock 24 presented on Screen 14, has a continuous time interval of automatic movement, which is always represented.

The type of information, its relative coordinates, and its display information configuration of the FIG. 20A, contained on 21A, is based on the pixel by pixel set of properties, like brightness, RGB color, among others. The type of information, its relative coordinates, and its display information configuration of the text 20B, contained in 21B, is base don a pixel set of pixel of properties, like brightness, RGB color, among others, and corresponding to the current font set specification. The difference in resolution between window 21A and 21B represents the current used window and the not-currently in use window on the background. The Second Processing 40 gives the representation of the visual information in a suitable format for the Output Board 60, and algorithms of normalization, scaling and average of the pixel-embodiment ratio information is made as well. The Main Control 50 commands and controls the set of individual embodiment's expulsion of air, altering the variables of pressure, frequency and temperature for every single embodiment in order to represent accordingly the displayed information on Screen 14, noticing that all these processes are made either with the actual Screen 14, or not.

The recognition and processing of the information corresponding to the frames of the different windows 21A and 21B is made by Window Frame Position Manager 42B. The information of the coordinates, event, and state of the Pointing Device 12 represented as the arrow 22 on FIG. 2 is made by the Pointing Device Tracker Manager 42G on FIG. 1, where the final differentiation of types of information is made by 42H.

The information contained in the representation of the image of 20A, the values of RGB, hue, brightness, among other pixel value data, of every pixel that characterizes the image of 20A has a processing of normalization, scaling, and average of the pixel area, as well as the corresponding, and reconfigurable, assignment of the values o fair expulsion of burst pressure, frequency, and temperature, in order to make a correct representation of that image, or absence blank space, information is made by Pixel-Wixel Data Convert Unit 41A on FIG. 1.

The First Data Conversion Definition Memory 43A stores the previous values of pixel-embodiment information that were allocated before to change in the difference of embodiments that were representing previous information in a difference time of refreshing information, which such elapsed time can be reconfigured. The default conversion characterizes the relative strong values of colors and hue into relative strong values of pressure, frequency, temperature, or combination of them. This dual relation color-embodiment variables can be re adjustable in accordance to user preferences, by a configuration routine that re assigns specific values of the variables into user preferences, making the air ejecting of Output Board 60 as personalized as possible. The storage information of those variables by the First Data Conversion Definition Memory 43A serves as well as a way to smooth the transition between a previous state and the current one, giving a range of possible processing of values that could make the transition more soft for human tactile. In addition, the displaying of text on 20B, with its own font format, is made by differing the information of relative coordinates, normalizing, scaling and averaging of the pixel-embodiment ratio made by the Pixel-Wixel Data Converter Unit 41A, in FIG. 1, and the recognized font information, assigning the respective default, but reconfigurable, of the air ejecting values of the fluid pressure, frequency, and temperature constant for output text assigned to every single embodiment on the Output Board 60.

The information related with the representation of an image 20A displayed on Screen 14, in the window 21A, is output in a form of air ejection by the execution of the First Control Unit 51A commanding over the set of embodiments that represent the respective image 62 or text 64A object that is displayed on the Screen 14 over the Output Board 60. The different tones, RGB, hue, among the other information appearing on the images and text presented on its pixel displayed information are characterized as different variables of pressure, frequency, and/or temperature values that distinguish air ejection among the other embodiments' gushes, as darker values in 62A represent a stronger value in any, or combination, of the burst's variables of pressure, frequency, and temperature, while in 62B the softer illustration represents a lower value of the same variables applied to the characterized image, so the burst air from the embodiment would be either less strong pressure, with less frequency, lower temperature, or combination of those. The control of the different embodiment elements, and their combination values of pressure, frequency and temperature, is made by the First Control Unit 51A. The lack of air burst on the Output Board 60 represents a lack of visual displaying on the Screen 14. Furthermore, the assignment of stronger image representation to stronger values of the variables of pressure, frequency, and temperature, or combination of those, can be re configured to a personalized value specified by the user in a re setting task.

If it is configured, the representation of text 20B of the window 21B is re formatted to a pre-established but configurable Braille system, in the current language that the OS' Window Manager is capable to display, for its representation in the air burst of the embodiment in the Output Board 60, so the word 20B "Flower" is represented on the window 61B like 64A "Flower" displayed as a word with dotted definition, or as a 64B where it is displayed the Braille translation of the English word in the specification of the Braille system as shown in "f" 64B1, "l" 64B2, "o" 64B3, "w" 64B4, "e" 64B5, "r" 64B6.

On FIG. 2, the characterization of the 64A and 64B are presented because the window 21B on the Screen 14 is located under window 21A but not being an obstacle for the display of the word 20B "Flower", so the window 61B characterizes the objects and elements that are visible on Screen 14, but in the case that just part of the text is visible on the window 21B, the same proportion of the word would be represented and the respective embodiment would be controlled for a tactile representation on the Output Board 60.

The information of current coordinates, event, and status of the frames in window 21A and the corresponding visible representation of window 21B is processed and the respective values of pressure, frequency, and temperature is assigned to the respective characterization of those windows, by the Window Frame Position Data Converter 41B shown on FIG. 1. The other way for differencing the active window is by altering the refreshing and synchronization of the burst of air of the windows, objects, and elements that are displayed on Screen 14, made by Window Selection Unit 44 and processing the information of difference in frequency and refreshing, so the window 21A and 21B visualized on Screen 14 can be represented tactile in different frequency and refreshing 61A and 61B in differently on the Output Board 60. On the same way, a different way to differentiate windows on a desktop, or any other similar encapsulating objects contained on the desktop, is by the intensity in the value of the pressure of the burst of the pixel involve in representing every window, or object, so higher values mean active window. These characteristics could be also re configured to specific assignation of settings by the final user.

The process of encoding the text displayed on Screen 14 onto a dotted format of text and assigning the final values in the combination of variables of pressure, frequency and temperature of the different embodiments involved in the representation of the text has a limit in size. Where the text to be dotted formatted has a small size, the representation on the Output Board 60 will take the form of abbreviated Braille system, on the default language the OS' Window Manager controls and displays. The Braille system has the advantage of small representation, as shown in 64B on FIG. 2.

The menus 23A and 23B displayed on the windows 21A and 21B, respectively, on Screen 14 corresponds to the menu that the OS' Window Manager 20 processes and controls. The representation of the menu of any and all of the windows presented is done by the Menu Bar Manager 42D of the FIG. 1. In order to represent the menu description onto the air burst of the embodiments from Output Board 60, the Menu Bar Manager 42D encodes the value of text into a proposed abbreviated Braille system for representation of menu, like 63A and 63B where the menu description has a standardization across application that run on the OS of First Processing 30. In order to use as less space as possible, and to represent small text like the menus bar 23A and 23B on the windows 21A and 21B, the abbreviated Braille system is a minimal characterization, as seen in 63A and 63B, which can be reconfigurable by the final user.

The information processed by the Visual Event Manager 42E, on FIG. 1, corresponds to the different events as clicking, dragging, mouse over, mouse on, open window, close window, display menu contents, among many others, so the prioritization and corresponding effects that some OS' Window Manager 20 have is characterized in the values of the variables of fluid burst of pressure, frequency and temperature. Furthermore, other elements and objects from the OS' Window Manager that provides no direct interaction with the user but just information to them, like the Clock 24, is managed as well by the Visual Event Manager 42E on FIG. 1. The representation of the Clock 66 on the Output Board 60 of the respective air burst of embodiments, is characterized by the movement of the hands is synchronized by the assignation of specific value variables of the air burst in the corresponding embodiments, so the representation of the time can be tactilely perceived and moving according to the hands of the clock.

The visual display on Screen 14 of the Pointing Device 12 is shown as 22, and the processing of the information for its representation, coordinates, events, and state on the Output Board 60 is made by 41C shown in FIG. 1.

The values of the previous coordinates, events and states is stored by 43C, giving this information for providing a better transition of the representation in the assignation of the values of pressure, frequency, temperature, or combination of those.

The representation of 22 can be tactile recognized 65 on the Output Board 60 by a specific combination of 5 air burst that contain specific values of the variables of pressure, frequency and temperature, but such configuration could be reset by the final user to them personalized settings.

A notable characteristic of 22 is that when the Pointing Device 12 is physically moved, there is just no a visual representation 22 of it on Screen 14 but also a tactile recognition of the same correspondent movement on the Output Board 60 by the air bursts of the embodiments that characterize with the relative coordinates, event, and status.

The Final Instruction Recognition Unit 42H, in FIG. 1, assigns the values of the variables that are responding by the events occurred by 22, and the Visual Event Manager 42A reconfigures the values of the variables of the involved characterized embodiments, so events like click, or double-click are also represented with their corresponding characterized embodiment's air bursts and values of the variables.

Window Selection Unit 44, FIG. 1, is responsible of altering the state of the objects involved from the events of Pointing Device 12, so both Window Frame Position Data Converter 41B and Pixel-Wixel Data Converter Unit 41A assign those values to the respective set embodiments involved, for windows by the 41B, and for images and text by the 41A.

One example is when 65 moves over 22 and executes click on any area of 12, there is a tactile perception of the click, the window 61B becomes the active one, displaying all the area of 61B, and making its representation with the most pressure, frequency or temperature, and all the elements and objects contained in it also become with a higher value of those variables, and at the same time window 61A becomes inactive, and all the objects and elements included on it also become inactive and the areas that limiting the perception of the active window become cover and some of its information could become under it.

Other events as dragging also affect the current focus, the representation of the dragged image, and the origin of that image. By clicking physically on the Pointing Device 12 and drag an image from one window to another, the Pixel-Data Converter Unit 41A manages the information concerning the image itself affecting the corresponding embodiments and their values of the variables, while the Window Frame Position Data Converter 41B reconfigures the values of the frames giving higher values to the new active window and its elements, and the movement of the Pointing Device itself onto the Output Board 60 are represented on this event. Furthermore, other events like mouse on or triple click can be configured to represent specific air burst from the embodiment in the Output Board 60.

FIGS. 3 and 4 will control the physical air burst from the embodiment, and will be explained next.

The generic unit where the burst of air with different qualities is ejected, and the components that are integrated with this apparatus, is called "wixel", and stands for "wind element". The Main Control 50 is composed of a matrix of embodiments called "wixels", such matrix is a physical representation of the matrix of pixels found in any displaying device, say Screen 14. The Main Control 50 commands the air burst variables of pressure, frequency and temperature, for every single embodiment contained in its matrix.

Every generic embodiment 50A, which permits the burst fluid that enables tactile perception, is commanded by the Main Control Manager 53, which also controls the Air Pump 52, which provides air into the system, and finds the first control valve 50A1 and the second control valve 50A2 is in charge of regulating the pressure value of the discharged fluid, then the frequency selector 50A3 which controls the pressure and frequency, and the output of it is conducted to the final air emission towards the heating control 50A4, that gives the corresponding temperature to the discharged air released from the aperture 61.

Furthermore, the Main Control Manager 53 manages the differential values of pressure is made by the control valve 50A2 and frequency made by the valve 50A3, and the differential temperature values made by the heating control 50A4, for every single embodiment. The first control valve 50A1 is the first control that permits the air to flow towards the mechanical pneumatic system, controlled by the Main Control Manager 53, which also commands a continuous reinforcement of the availability of flowing air in 50A2, from the Air Pump 52, with the change in operation made by the first control valve 50A1.

The air that is controlled in the second control valve 50A2 is generated in Air Pump 52, and getting instruction from the Main Control Manger 53 to make or not flowing fluids to aperture 61.

The value of the quantity of fluid (pressure) is solved by the control valve 50A2, while the speed of flowing intermissions (frequency) is solved by the control valve 50A3, which makes the necessary aperture in size and time frame in order to let pass controlled flowing fluids towards the end of the pneumatic system, the aperture 61.

The value of the temperature of the fluid is controlled by the heating mechanism 50A4. The control of temperature represents either the augmentation of the heat or the degradation of it by its absence, cooling it.

The Air Pump 52 is always controlled and managed by the Main Control Manager 53, which commands the general pressure and makes several tests for maintenance of it.

On FIG. 3 it is represented the absence of the flowing of fluids, when there is no tactile information represented on Output Board 60, which means lack of visual information on Screen 14 as well. On the FIG. 3, the jovan david Main Control Manager 53 controls the control valve 50A1 making the fluid being stopped and the busting air from aperture 61 is stopped. In this state, the fluid controlled by the second control valve 50A2 is cut off, so there is no supply of fluid bursting to aperture 61.

FIG. 4 shows a state where the fluid is flowing out from the embodiment, making a tactile perception of information. On this figure, the Main Control Manager 53 makes the command to first control valve 50A1, and second control valve 50A2 to let the fluid pass with a certain value of pressure. When the air is supplied towards control valve 50A3, the valve moderates the assigned value of frequency of air burst that the respective embodiment 50A is needed to output and delivered towards the aperture 61.

On FIG. 5 it is exemplified a control design for a matrix of embodiments. The same abbreviation is used on this graphic as well. FIG. 5 represents basically the power control explained in FIG. 3 and FIG. 4 but arranged in a matrix of 4×2. This basic configuration consists in the basic representation of a Braille character, in the Braille system. The Output Board 60 is formed by "n" by "m" number of embodiments, and basically following the same design but amplified to the specific size that the Output Board 60 could have.

On FIG. 6 it is shown the different states that a segment of the Output Board 60 could look at certain time. It is shown the different ways of how the burst fluid could be delivered in order to produce tactile perception. In the figure, the aperture 60A1 represents a normal 1× scale of pressure of fluid burst delivered from a embodiment aperture, in this case the flowing is constant in pressure frequency and temperature. In aperture 60A2 it is represented the lack of air burst, indicating a nil expulsion of air, and a null tactile perception from it. Aperture 60A3 indicates an expulsion of air with a relative stronger pressure, comparing with the other ones. And in aperture 60A4 the relative high frequency and low pressure is represented. Those differences in the values of the variables of pressure, frequency and temperature of the expelled fluids from the Output Board 60, make it possible to perceive deeper information in a tactile manner.

The fluid (air) can have different compositions, not just being air but also any gas that an Air Pump 52 might be able to carry and burst. The use of gas cylinder is also possible instead of, or in addition to, an Air Pump 52.

The above described perceptual apparatus of this invention consists in the displayed information appeared on the Screen 14, that was processed by the OS' Window Manager 20 and the First Processing 30, and the image and text information is processed by the Displayed Information Recognition Unit 42A, which performs the processes of normalization, scaling, and averaging of the pixel-embodiment ratio and the corresponding assignation of the values of air burst pressure, frequency and temperature in order to characterize those images and text. After the pooling the previous historic data from the First Data Conversion Definition Memory 43A, and combining it with the processed one from 42A, the information is combined for accurate refreshing and smooth transition of information and the final assignation is made, all of those, by the Pixel-Wixel Data Converter Unit 41A, which transmits this information to the First Control Unit 51A, which is in charge to the physical assignation of the embodiments that will be used on the Output Board 60, whose matrix of embodiments characterize the displayed information on Screen 14 producing a tactile perception of those images and text on the Output Board 60 by individually giving specific values of pressure, frequency and temperature to the air burst that is ejected from every single aperture 60As. When text is present, and it is required to be encoded to the Braille system, the Braille Text Converter 45A makes that processing, and transmits it to the Selection Information Unit 45B.

Also, the representation of the information on Screen 14 of the elements of the windowing environment, like window frame, menu bar, buttons, events and states of the objects included inside the different windows, controlled by the OS' Window Manager 20 are processed by Window Frame Position Manager 42B, Desktop Information Manager 42C, Menu Bar Manager 42D, and Visual Event Manager 42E, process the corresponding values of air burst pressure, frequency, and temperature that characterize those elements on a tactile representation on the Output Board 60, such information being transmitted first to the Window Frame Position Data Converter 41B, which also receives data from the Window Selection Unit 44, which provides information about the current event and selection of information, and the Second Data Conversion Definition Memory, which stores previous states of those elements permitting a smooth transition. The information processed by the Window Frame Position Data Converter 41B is transmitted to the Second Control Unit 51B which controls the physical pneumatic system of the matrix of embodiment's aperture contained on the Output Board 60, in order to produce a tactile perception of those windowing environment elements, like different windows, a current focused window and background windows, with their properties of frame and others changed to express that visual properties in a tactile way. In the case of the text displayed on the Menu of the window(s) presented on the desktop, the conversion to an Abbreviated Braille System for representing the elements of the menu is processed and transmitted and represented on the Output Board 60.

In addition to the previous representation of visual information that appears on the Screen 14, there is the visual representation of the Pointing Device 12 on Screen 14, such properties of coordinates, events and states are recognized by the Pointing Device Tracker Manager 42G which transmits such information to the Pointer Conversion Position Manager 41C, which receives information of previous coordinates, events and states of the visual representation 22 by the Pointer Definition Memory 43C, and combining both sources of information it processes the values of the variables of pressure, frequency and temperature of the required embodiments in order to represent the Pointing Device 12, and this information is transmitted to the Third Control Unit 51C, which assigns those values of variables to the physical embodiment involved in such representation of 12 producing a tactile perception over Output Board 60. In this manner, when the user moves physically the Pointing Device 12 on the Screen 14, its direction, actions, and events can be felt as well on the Output Board 60.

The Main Control 50 is in charge of coordinate the First 51A, Second 51B, and Third Control Unit 51C that affect the behavior of the burst expelled from the apertures of the embodiments contained in the Output Board 60, and also, it solves problems among them, recalibrates, and executes maintenance tasks, as well as it communicates and controls the Air Pump 52.

All these representations of information (images, text in dotted format, text in Braille system, windowing elements like windows, menu bar, text of the menu bar presented as Abbreviated Braille System, buttons, events, focus, and the pointer) can be used by a visually impaired person that uses a personal computer, or other computing device that presents a conventional display output, in order to understand and managers such computing instrument. It could also be used by visually normal user, in order to immerse themselves into a better representation of the information.

The refreshing of the elements perceived on the Output Board 60 adds more realism to such perception. The refreshing time is a setting that can be reconfigurable by the final user.

The use of Sensor Input Modules 13 transmitting information that they sensor into the First Processing 30 can be of great aid to understand tactile phenomena like sound, ultrasound, radioactivity, infrared, ultraviolet, atmospheric pressure, atmospheric temperature, speed, acceleration, curvature, angle, inclination, inclination, magnetism, electric current, voltage, resistance, among others. There is sometimes no easy way to present a visual representation of these phenomena, but there is always a way to alter the variables of pressure, frequency, and temperature in the streams of fluids that come from the apertures 50As of the embodiments contained in the Output Board, producing a tactile perception of those phenomena, and understanding them better.

The representation and characterization of such variables of air burst pressure, frequency, and temperature can be reset, in accordance to the user's preference. Such personalized assignation of variables make the Output Board as configurable with a extreme degree of decoding, making it a natural way to secure information.

The perception device described in this invention is suitable as the device where the visually impaired person uses a personal computer.

The described apparatus of this invention is suitable to stroke rehabilitation person, by simulating tactile.

The perception device of this invention is also suitable for people with learning difficulties, as a means to rehabilitate it. Such learning difficulties are not limited to dyslexia, and autism.

The perception device could help visually impaired people enjoy video games. And visually normal people could enjoy also the immersion of the information in the video game by the use of this device.

The property of individualize the characterization of the variables by the personal setting of the user makes it a very way to protect data, adding a strong security level to the information.

The invention claimed is:

1. A device for tactile perception by a user of information formatted for display on a display device, the device comprising:
   (a) a tactile apparatus for contact with an area of skin of the user, said apparatus comprising a plurality of burst opened points which permit a fast flow of a fluid, the fast flow of the fluid being subject to control to represent information in a tactile manner through contact of the fluid with the area of skin of the user, said tactile apparatus subject to control of an Output Board;
   (b) a Displayed Information Recognition Unit which:
      (i) determines an image value, a text value, a resolution value, a brightness value, and an RGB value from every pixel formatted for display on the display device, thereby generating a set of pixel data values;
      (ii) processes the set of pixel data values by normalizing, scaling and averaging a pixel-supplied air ratio; and
      (iii) transmits the set of pixel data values and the pixel-supplied air ratio to a Selection Information Unit capable of transmitting information to a Pixel-Wixel Data Conversion Unit;
   (c) the Pixel-Wixel Data Conversion Unit capable of transforming the set of pixel data values and the pixel-supplied air ratio into an array of burst output values comprising a pressure value, a frequency value and a temperature value, said array of burst output values being transmitted to an Output Board controlling the tactile apparatus; and
   (d) the Output Board controlling the tactile apparatus in a manner such that the array of burst output values is executed by the tactile apparatus.

* * * * *